(12) United States Patent
Mitsui et al.

(10) Patent No.: US 11,774,812 B2
(45) Date of Patent: Oct. 3, 2023

(54) OPTICAL CONTROL DEVICE

(71) Applicant: Japan Display Inc., Tokyo (JP)

(72) Inventors: Masashi Mitsui, Tokyo (JP); Takeo Koito, Tokyo (JP); Tae Kurokawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/698,158

(22) Filed: Mar. 18, 2022

(65) Prior Publication Data

US 2022/0206347 A1 Jun. 30, 2022

Related U.S. Application Data

(63) Continuation of application No. PCT/JP2020/029048, filed on Jul. 29, 2020.

(30) Foreign Application Priority Data

Sep. 25, 2019 (JP) .................. 2019-174015

(51) Int. Cl.
*G02F 1/1347* (2006.01)
*G02F 1/1343* (2006.01)
*G02F 1/1335* (2006.01)

(52) U.S. Cl.
CPC ...... *G02F 1/1347* (2013.01); *G02F 1/133528* (2013.01); *G02F 1/134318* (2021.01)

(58) Field of Classification Search
None
See application file for complete search history.

(56) References Cited

U.S. PATENT DOCUMENTS

2019/0033669 A1   1/2019  Presniakov et al.

FOREIGN PATENT DOCUMENTS

| JP | 2006-201243 A | 8/2006 |
| JP | 2009-139623 A | 6/2009 |

OTHER PUBLICATIONS

International Search Report dated Oct. 20, 2020 in PCT/JP2020/029048 filed on Jul. 29, 2020, 3 pages.
Office Action dated Jun. 20, 2023, in corresponding Japanese Application No. 2019-174015; 8 pages.

*Primary Examiner* — Phu Vu
(74) *Attorney, Agent, or Firm* — Maier & Maier, PLLC

(57) ABSTRACT

According to one embodiment, an optical control device includes a first liquid crystal cell and a second liquid crystal cell. The second liquid crystal cell is stacked on the first liquid crystal cell. The first liquid crystal cell has a function of modulating and converting a first polarization component of incident light into a second polarization component, and hardly modulating and converting a third polarization component of incident light into a fourth polarization component. The second liquid crystal cell has a function of hardly modulating the second polarization component transmitted through the first liquid crystal cell, and modulating the fourth polarization component transmitted through the first liquid crystal cell.

15 Claims, 13 Drawing Sheets

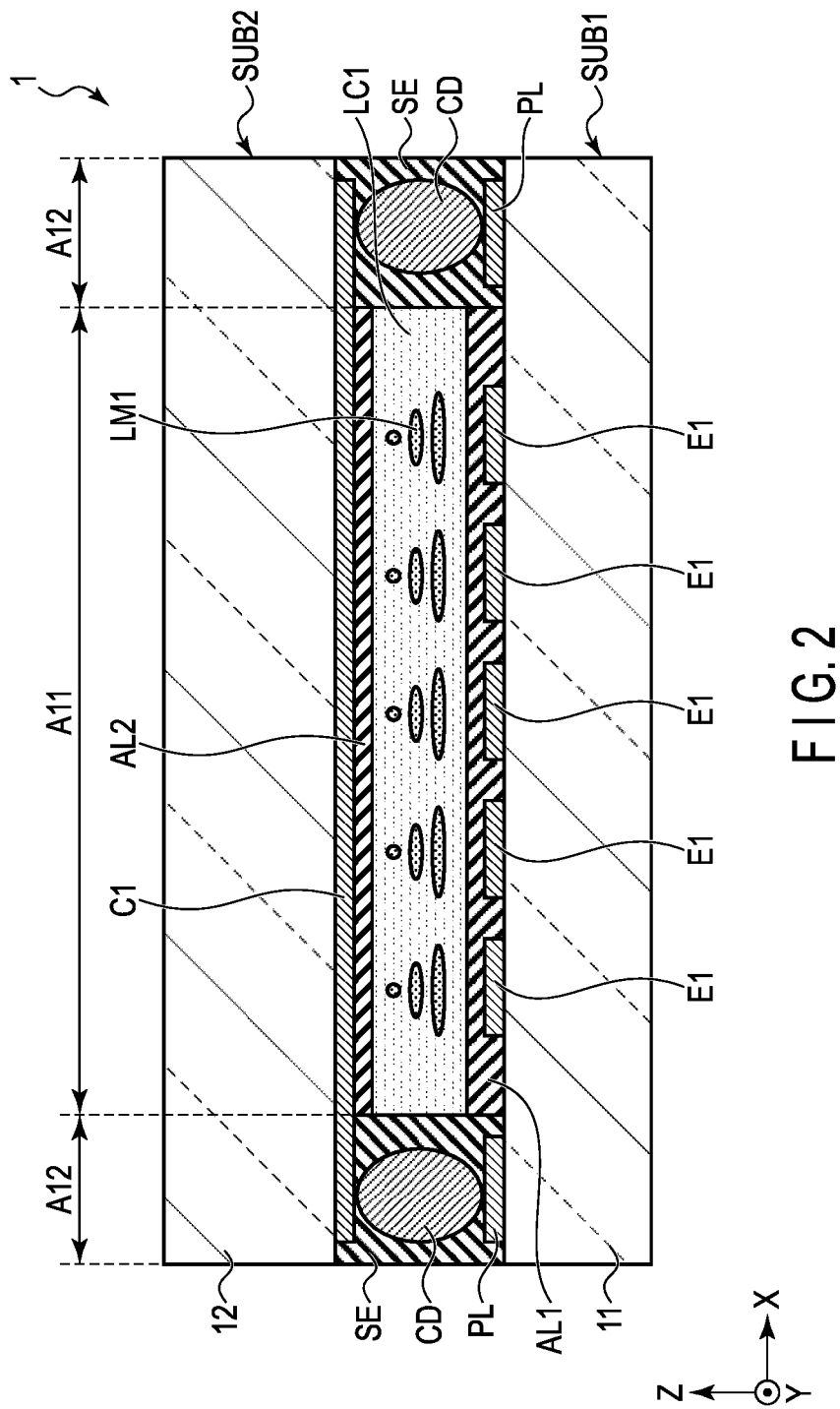
F I G. 2

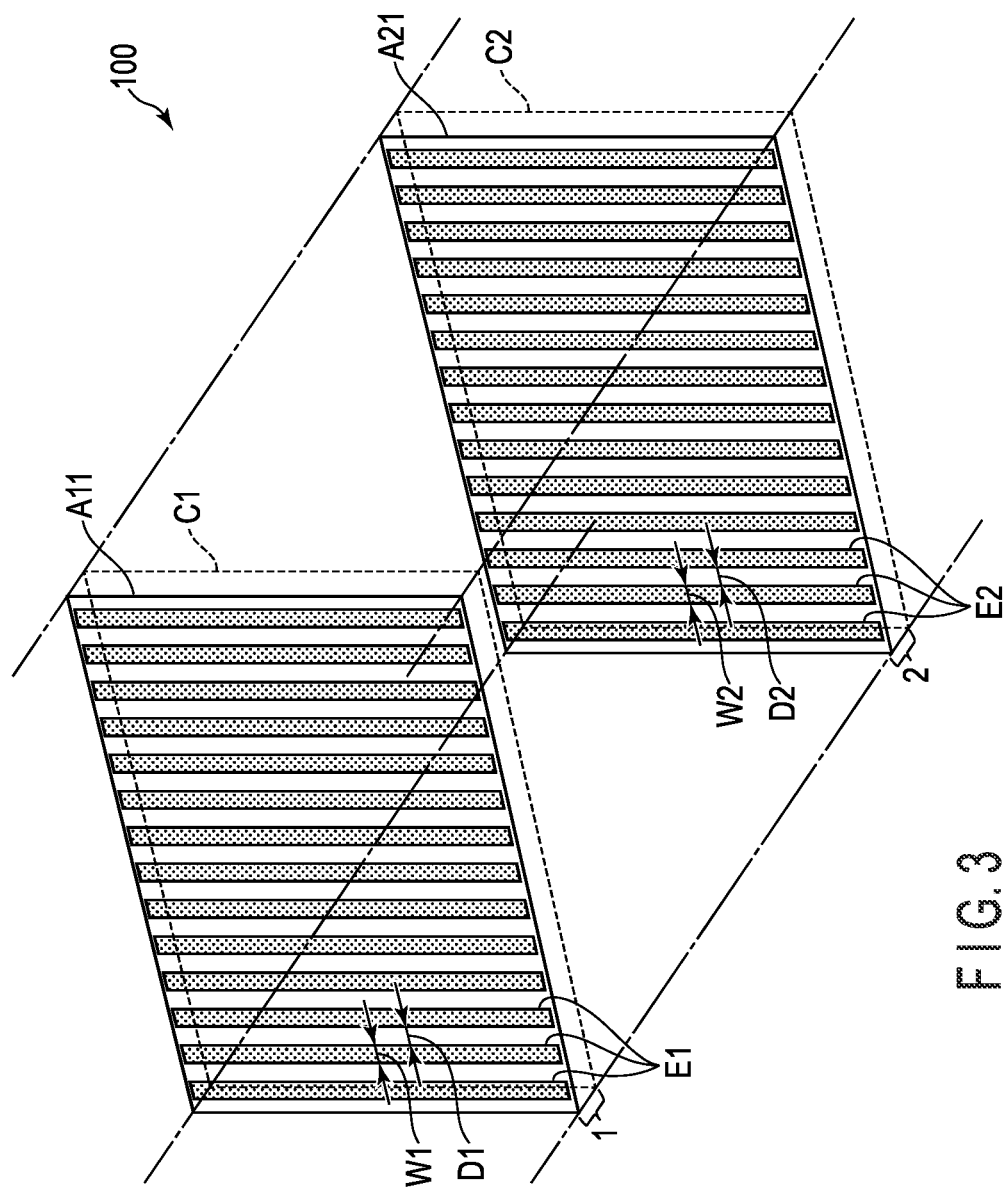
F I G. 3

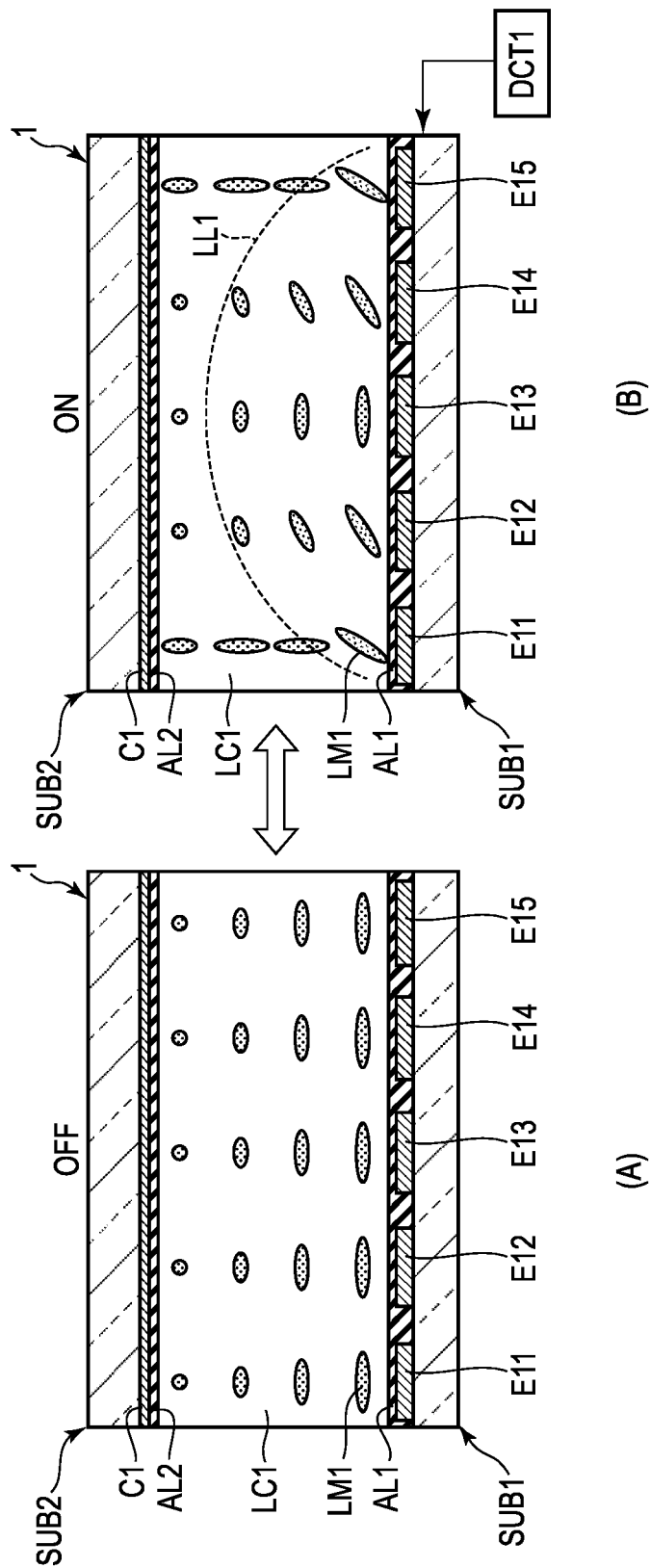
F I G. 4

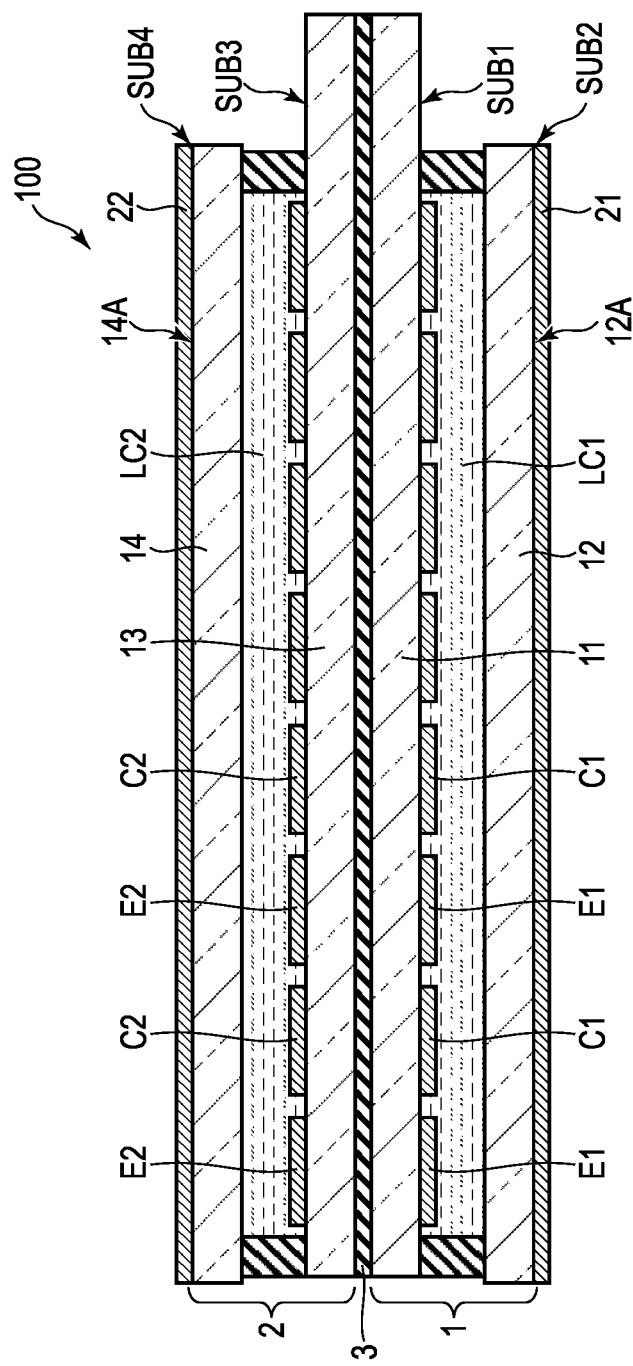
F I G. 13

OPTICAL CONTROL DEVICE

CROSS-REFERENCE TO RELATED APPLICATIONS

This application is a Continuation Application of PCT Application No. PCT/JP2020/029048, filed Jul. 29, 2020 and based upon and claiming the benefit of priority from Japanese Patent Application No. 2019-174015, filed Sep. 25, 2019, the entire contents of all of which are incorporated herein by reference.

FIELD

The embodiment of the present invention relates to an optical control device.

BACKGROUND

In recent years, an optical control device using a liquid crystal cell has been proposed. Such an optical control device primarily converges or diverges a light beam of one polarization component. For example, an optical control device is disclosed in which two liquid crystal cells are stacked, one polarization component is modulated in one liquid crystal cell, and the other polarization component is modulated in the other liquid crystal cell.

BRIEF DESCRIPTION OF THE DRAWINGS

FIG. 2 is a cross-sectional diagram showing a configuration example of a first liquid crystal cell 1.

FIG. 3 is an exploded perspective diagram showing a main part of the optical control device 100.

FIG. 4 is a diagram for describing a liquid crystal lens LL1 formed in the first liquid crystal cell 1.

FIG. 13 is a cross-sectional diagram showing another configuration example of the optical control device 100.

DETAILED DESCRIPTION

Figure 1:
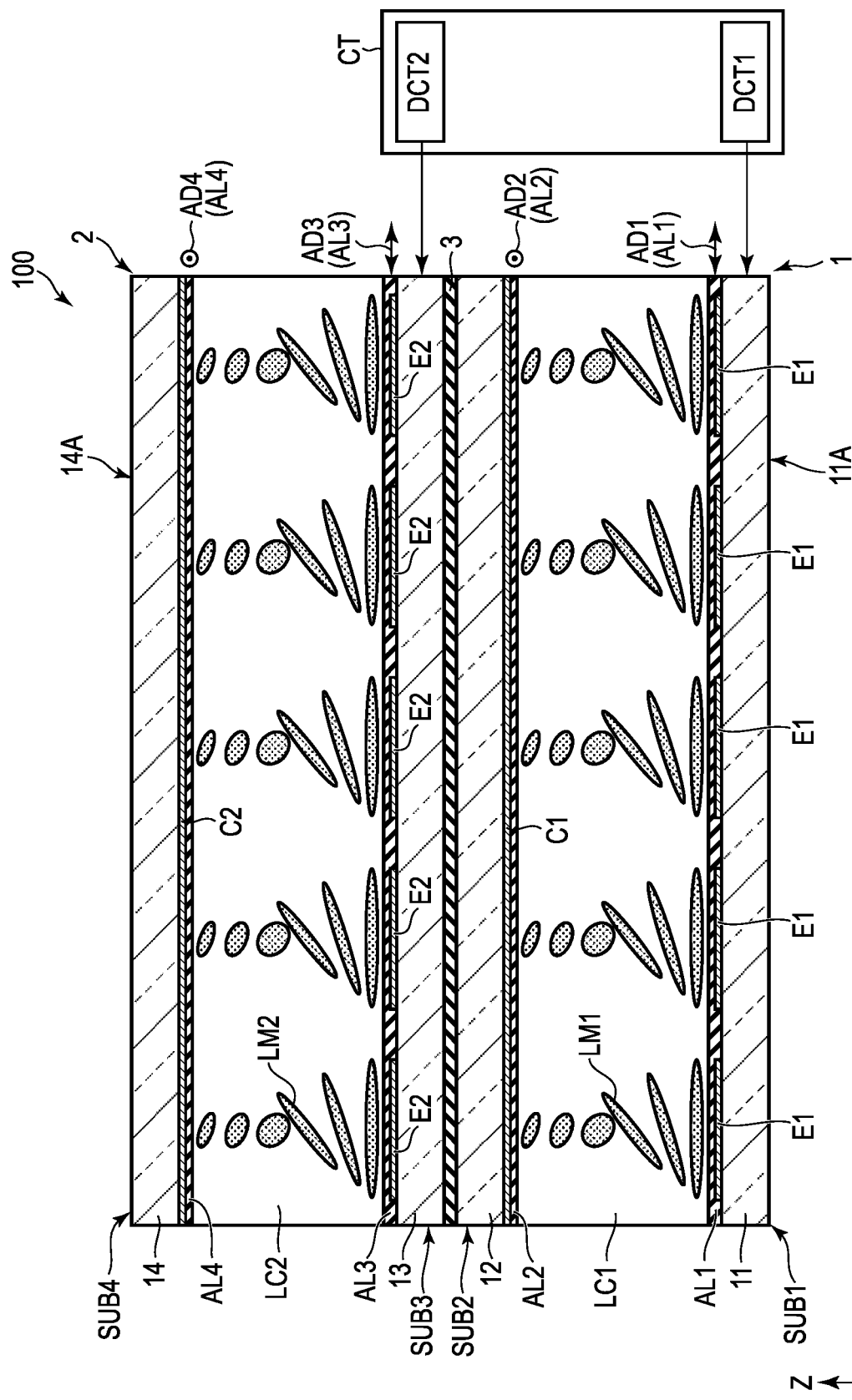
FIG. 1 is a diagram showing a configuration example of an optical control device 100 according to one embodiment.

In general, according to one embodiment, an optical control device includes a first liquid crystal cell including a first substrate including a plurality of first control electrodes, a second substrate, and a first liquid crystal layer twisted and aligned between the first substrate and the second substrate, and a second liquid crystal cell including a third substrate including a plurality of second control electrodes, a fourth substrate, and a second liquid crystal layer twisted and aligned between the third substrate and the fourth substrate. The second liquid crystal cell is stacked on the first liquid crystal cell. The first control electrode overlaps the second control electrode. The first liquid crystal cell has a function of modulating and converting a first polarization component of incident light into a second polarization component, and hardly modulating and converting a third polarization component of incident light into a fourth polarization component. The second liquid crystal cell has a function of hardly modulating the second polarization component transmitted through the first liquid crystal cell, and modulating the fourth polarization component transmitted through the first liquid crystal cell.

According to one embodiment, it is possible to provide an optical control device that can be manufactured at low cost.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a diagram showing a configuration example of an optical control device 100 according to one embodiment. For example, a first direction X, a second direction Y and a third direction Z are orthogonal to each other, but they may intersect at an angle other than 90 degrees. In the following descriptions, viewing from above downward onto an X-Y plane defined by the first direction X and the second direction Y is referred to as planar view.

The optical control device 100 includes a first liquid crystal cell 1, a second liquid crystal cell 2, and a control unit CT. The first liquid crystal cell 1 and the second liquid crystal cell 2 have substantially the same component.

The first liquid crystal cell 1 includes a first substrate SUB1, a second substrate SUB2, and a first liquid crystal layer LC1. The first substrate SUB1 includes an insulating substrate 11, a plurality of first control electrodes E1 provided on the insulating substrate 11, and an alignment film AL1 covering the first control electrodes E1. The second substrate SUB2 includes an insulating substrate 12, a first common electrode C1 provided on the insulating substrate 12, and an alignment film AL2 covering the first common electrode C1. The first common electrode C1 is opposed to the plurality of first control electrodes E1.

The second liquid crystal cell 2 includes a third substrate SUB3, a fourth substrate SUB4, and a second liquid crystal layer LC2. The third substrate SUB3 includes an insulating substrate 13, a plurality of second control electrodes E2 provided on the insulating substrate 13, and an alignment film AL3 covering the second control electrodes E2. The second control electrode E2 is formed so as to overlap the first control electrode E1 in the third direction Z. The fourth substrate SUB4 includes an insulating substrate 14, a second common electrode C2 provided on the insulating substrate 14, and an alignment film AL4 covering the second common electrode C2. The second common electrode C2 is opposed to the plurality of second control electrodes E2.

The insulating substrates 11 to 14 are, for example, transparent substrates such as glass substrates and resin substrates.

The first control electrode E1, the second control electrode E2, the first common electrode C1, and the second common electrode C2 are transparent electrodes formed of a transparent conductive material such as indium tin oxide (ITO) or indium zinc oxide (IZO).

The alignment films AL1 to AL4 are horizontal alignment films having an alignment restriction force approximately parallel to an X-Y plane. For example, an alignment treatment direction AD1 of the alignment film AL1 and an alignment treatment direction AD3 of the alignment film AL3 are both parallel to the first direction X. In addition, an alignment treatment direction AD2 of the alignment film AL2 and an alignment treatment direction AD4 of the alignment film AL4 are both parallel to the second direction Y. In other words, the alignment treatment direction AD1 is orthogonal to the alignment treatment direction AD2 in the first liquid crystal cell 1, and the alignment treatment direction AD3 is orthogonal to the alignment treatment direction AD4 in the second liquid crystal cell 2. Incidentally, the alignment treatment may be rubbing treatment or optical alignment treatment.

The first liquid crystal layer LC1 is held by the alignment films AL1 and AL2 between the first substrate SUB1 and the second substrate SUB2, and includes liquid crystal molecules LM1 that are twisted and aligned at 90 degrees. Similarly, the second liquid crystal layer LC2 is held by the alignment films AL3 and AL4 between the third substrate SUB3 and the fourth substrate SUB4, and includes liquid crystal molecules LM2 that are twisted and aligned at 90 degrees. These first liquid crystal layer LC1 and second liquid crystal layer LC2 have, for example, positive dielectric anisotropy.

The second liquid crystal cell 2 is stacked on the first liquid crystal cell 1 in the third direction Z. The insulating substrate 12 and the insulating substrate 13 are bonded to each other with a transparent adhesive layer 3. The refractive index of the adhesive layer 3 is equal to the refractive indexes of the insulating substrates 12 and 13. In contrast, an outer surface 11A of the insulating substrate 11 and an outer surface 14A of the insulating substrate 14 are each in contact with an air layer.

The control unit CT includes voltage controllers DCT1 and DCT2. The voltage controller DCT1 controls voltages to be applied to the first control electrode E1 and the first common electrode C1 in the first liquid crystal cell 1. The voltage controller DCT2 controls voltages to be applied to the second control electrode E2 and the second common electrode C2 in the second liquid crystal cell 2.

Such optical control device 100 is combined with, for example, a light source that emits non-polarized light, and is installed so that the outer surface 11A serves as an entrance surface of light. The first liquid crystal cell 1 has a function of modulating and converting a first polarization component of incident light into a second polarization component, and hardly modulating and converting a third polarization component of incident light into a fourth polarization component. The second liquid crystal cell 2 has a function of hardly modulating the second polarization component transmitted through the first liquid crystal cell 1, but modulating the fourth polarization component transmitted through the first liquid crystal cell 1. The functions of the first liquid crystal cell 1 and the second liquid crystal cell 2 will be described in detail later.

The modulation herein refers to converging or diverging a polarization component transmitted through a liquid crystal layer by a refractive index distribution type lens (hereinafter, referred to as a liquid crystal lens) formed in the liquid crystal layer. In other words, the first liquid crystal cell 1 converges or diverges the first polarization component, and the second liquid crystal cell 2 converges or diverges the fourth polarization component. In the first liquid crystal cell 1, the third polarization component is hardly converged or diverged, and similarly, in the second liquid crystal cell 2, the second polarization component is hardly converged or diverged. A degree of convergence or divergence (modulation rate) is controlled by the voltage applied to the liquid crystal layer. In other words, the modulation rate of the first polarization component in the first liquid crystal cell 1 is controlled by the voltage controller DCT1, and the modulation rate of the fourth polarization component in the second liquid crystal cell 2 is controlled by the voltage controller DCT2.

As described above, the first liquid crystal cell 1 and the second liquid crystal cell 2 have substantially the same components and have the same optical rotatory power. In the present embodiment, each of the first liquid crystal cell 1 and the second liquid crystal cell 2 has an optical rotatory power to rotate a polarization plane of the incident polarization component (linearly polarized light) by 90 degrees. In other words, the polarization plane of the first polarization component is orthogonal to the polarization plane of the second polarization component, and the polarization plane of the third polarization component is orthogonal to the polarization plane of the fourth polarization component. When the first polarization component and the third polarization component are orthogonal to each other, the first polarization component and the fourth polarization component have the same polarization plane, and the second polarization component and the third polarization component have the same polarization plane.

FIG. 2 is a cross-sectional diagram showing a configuration example of the first liquid crystal cell 1. Although the first liquid crystal cell 1 will be described here, the second liquid crystal cell 2 also has the same cross-sectional structure as the first liquid crystal cell 1, and the description thereof will be omitted.

In the first substrate SUB1, the plurality of first control electrodes E1 are arranged spaced apart in the first direction X in a first modulation area A11. A feed line PL is provided in a peripheral area A12 outside the first modulation area A11. The plurality of first control electrodes E1 and the feed line PL are electrically connected to the voltage controller DCT1 shown in FIG. 1.

In the second substrate SUB2, the first common electrode C1 is, for example, a single plate electrode that is located on substantially the entire surface of the first modulation area A11 and also partially extends to the peripheral area A12. In the first modulation area A11, the first common electrode C1 is opposed to the plurality of first control electrodes E1 through the first liquid crystal layer LC1. In the peripheral area A12, the first common electrode C1 is opposed to the feed line PL.

In the peripheral area A12, the first substrate SUB1 and the second substrate SUB2 are bonded together with a sealant SE. The sealant SE includes a conducting material CD. The conducting material CD is interposed between the feed line PL and the first common electrode C1 and electrically connects the feed line PL and the first common electrode C1.

FIG. 3 is an exploded perspective diagram showing a main part of the optical control device 100. Incidentally, the first common electrode C1 overlapping the first modulation area A11 and the second common electrode C2 overlapping the second modulation area A21 are indicated by dotted lines. In the first modulation area A11, the plurality of first control electrodes E1 are arranged spaced apart at regular intervals D1 in the first direction X. Each of the first control electrodes E1 is, for example, a strip electrode elongated in the second direction Y. Each of the first control electrodes E1 has the same width W1 along the first direction X. In a second modulation area A21, the plurality of second control electrodes E2 are arranged spaced apart at regular intervals D2 in the first direction X. Each of the second control electrodes E2 is, for example, a strip electrode elongated in the second direction Y. Each of the second control electrodes E2 has the same width W2 along the first direction X. The width W1 is equal to the width W2, and the interval D1 is equal to the interval D2. In other words, the plurality of first control electrodes E1 overlap the plurality of second control electrodes E2, respectively, in planar view. The widths W1 and W2 and the intervals D1 and D2 are, for example, from 10 μm to 30 μm.

In the example shown in FIG. 3, the first modulation area A11 and the second modulation area A21 are formed in a rectangular shape extending in the first direction X, but may be formed in a rectangular shape extending in the second direction Y, or may be formed in a circular shape, an elliptical shape, or other shapes. The first modulation area A11 and the second modulation area A21 have the same shape and overlap each other in planar view.

FIG. 4 is a diagram for describing a liquid crystal lens LL1 formed in the first liquid crystal cell 1. In FIG. 4, only configurations necessary for description are shown. Although not described, a liquid crystal lens LL2 similar to the liquid crystal lens LL1 to be described with reference to FIG. 4 can also be formed in the second liquid crystal cell 2.

(A) of FIG. 4 shows an off state (OFF) in which no potential difference is generated between the first control electrodes E11 to E15 and the first common electrode C1. The liquid crystal molecules LM1 included in the first liquid crystal layer LC1 are twisted and aligned by alignment restriction forces of the alignment films AL1 and AL2.

(B) of FIG. 4 shows an on state (ON) in which a potential difference is formed between the first control electrodes E11 to E15 and the first common electrode C1. The voltage controller DCT1 supplies a predetermined voltage to each of the first control electrodes E11 to E15 and the first common electrode C1. The first liquid crystal layer LC1 has positive dielectric anisotropy as described above. For this reason, in a state where an electric field is formed, the liquid crystal molecules LM1 are aligned so that their major axes are along the electric field. For example, the first control electrodes E11, E12, E13, E14, and E15 are supplied with voltages of 7V, 3V, 0V, 3V, and 7V, respectively, and the first common electrode C1 is supplied with a voltage of 0V.

Since an electric field along the third direction Z is formed in an area where each of the first control electrodes E11 and E15 is opposed to the first common electrode C1, the liquid crystal molecules LM1 are aligned so that their major axes are along the third direction Z. In an area where the first control electrode E13 is opposed to the first common electrode C1, almost no electric field is formed, and the liquid crystal molecules LM1 are maintained in the initial alignment state (twisted alignment state). In an area where the first control electrode E12 is opposed to the first common electrode C1, an intermediate alignment state between an area where the first control electrode E11 is opposed to the first common electrode C1 and an area where the first control electrode E13 is opposed to the first common electrode C1 is formed. In an area where the first control electrode E14 is opposed to the first common electrode C1, an intermediate alignment state between an area where the first control electrode E15 is opposed to the first common electrode C1 and an area where the first control electrode E13 is opposed to the first common electrode C1 is formed.

The liquid crystal molecules LM1 have refractive anisotropy Δn. For this reason, the first liquid crystal layer LC1 has a refractive index distribution according to the alignment state of the liquid crystal molecules LM1. Alternatively, the first liquid crystal layer LC1 has a retardation distribution or a phase distribution represented by Δn·d, where d is a thickness of the first liquid crystal layer LC1 along the third direction Z. Incidentally, the thickness d is, for example, from 10 μm to 50 μm. The liquid crystal lens LL1 indicated by dotted lines in the drawing is formed by such a refractive index distribution, a retardation distribution, or a phase distribution. The liquid crystal lens LL1 thus shown functions as a convex lens.

Next, functions of the liquid crystal lenses LL1 and LL2 by the optical control device 100 will be described with reference to FIGS. 5 and 6. In the following description, when the traveling direction of light is along the third direction Z, linearly polarized light having a polarization plane along the first direction X is referred to as first polarized light (P-polarized light) POL1, and linearly polarized light having a polarization plane along the second direction Y is referred to as second polarized light (S-polarized light) POL2. A light source LS emits non-polarized light including the first polarized light POL1 and the second polarized light POL2. The first liquid crystal cell 1 is located between the light source LS and the second liquid crystal cell 2.

Figure 5:
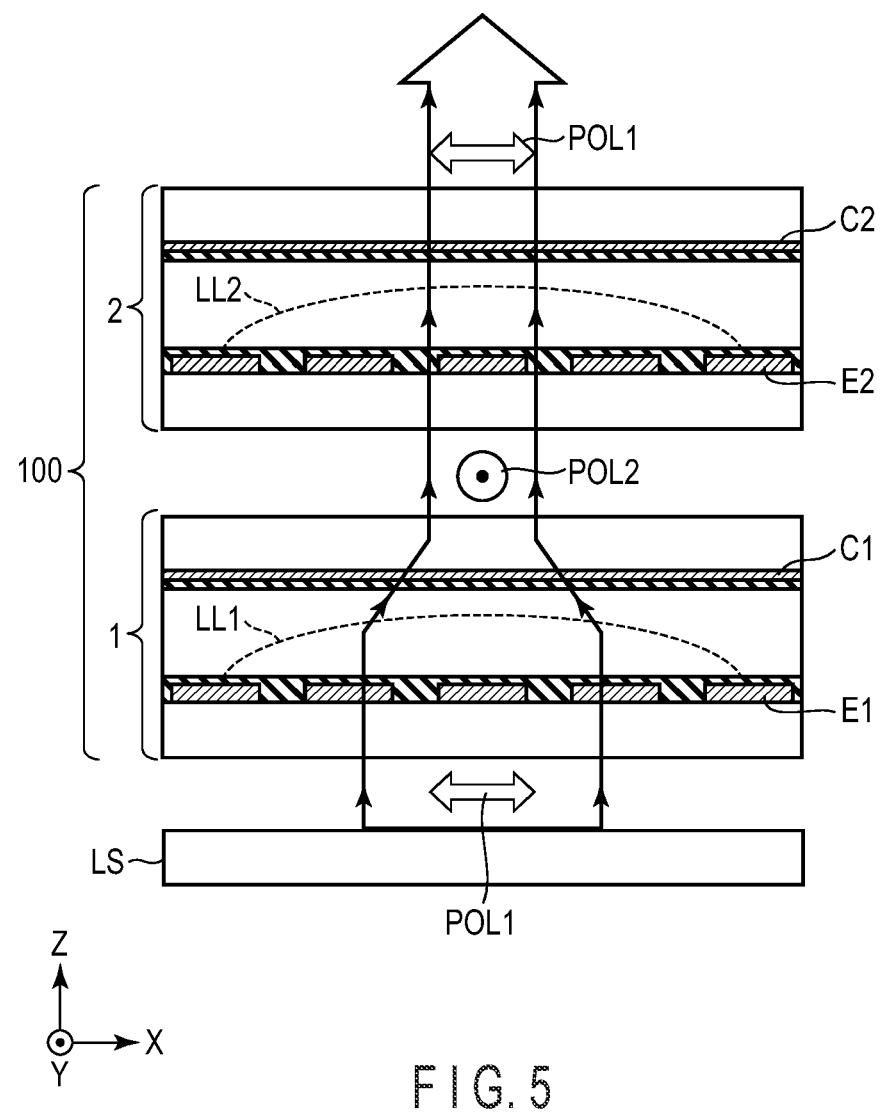
FIG. 5 is a diagram for describing functions of liquid crystal lenses LL1 and LL2 by the optical control device 100.

As shown in FIG. 5, the first polarized light (first polarization component) POL1 is converged by the liquid crystal lens LL1 in the first liquid crystal cell 1, and a polarization plane of the first polarized light POL1 is rotated by 90 degrees to be converted into the second polarized light (second polarization component) POL2. The second polarized light POL2 transmitted through the first liquid crystal cell 1 is transmitted through the second liquid crystal cell 2 without being converged by the liquid crystal lens LL2, and a polarization plane of the second polarized light POL2 is rotated by 90 degrees to be converted into the first polarized light POL1. In other words, of the light emitted from the light source LS, the first polarized light POL1 is converged by the optical control device 100.

Figure 6:
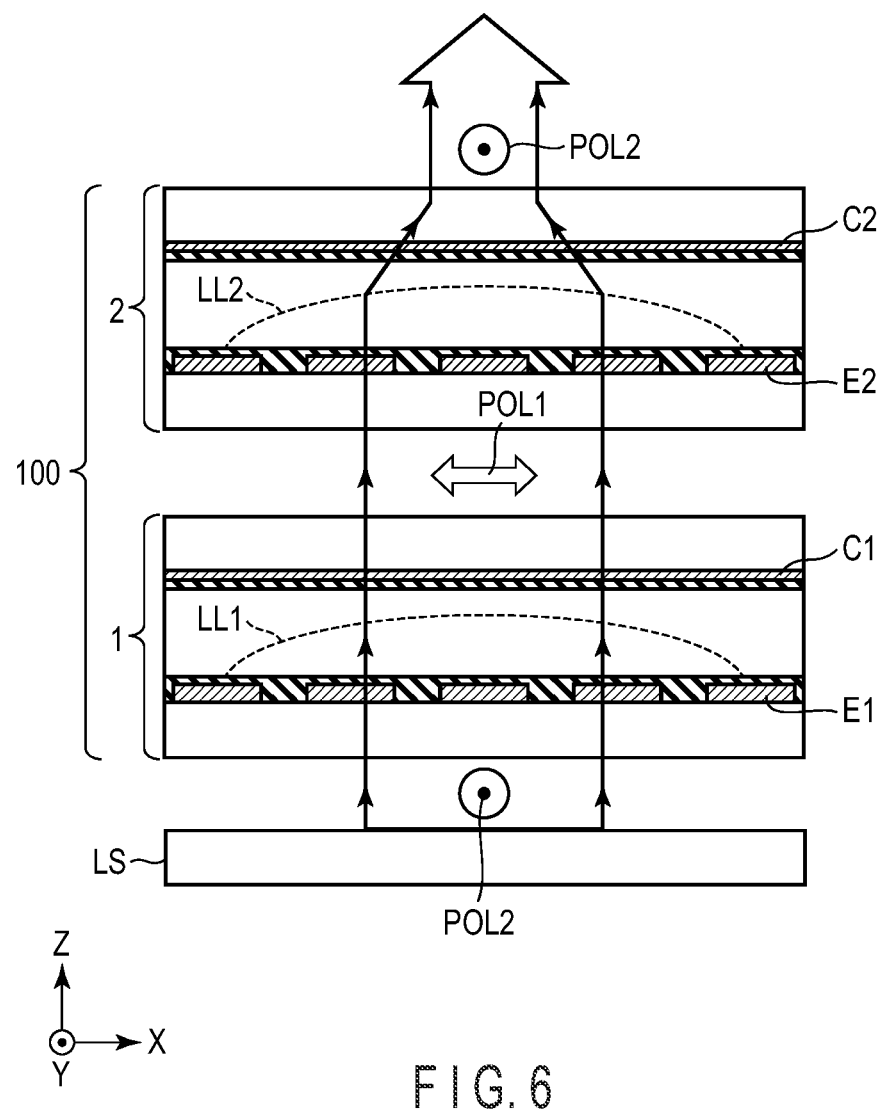
FIG. 6 is a diagram for describing functions of liquid crystal lenses LL1 and LL2 by the optical control device 100.

As shown in FIG. 6, the second polarized light (third polarization component) POL2 is transmitted through the first liquid crystal cell 1 without being converged by the liquid crystal lens LL1, and the polarization plane of the second polarized light POL2 is rotated by 90 degrees to be converted into the first polarized light (fourth polarization component) POL1. The first polarized light POL1 transmitted through the first liquid crystal cell 1 is transmitted through the second liquid crystal cell 2 being converged by the liquid crystal lens LL2, and the polarization plane of the first polarized light POL1 is rotated by 90 degrees to be converted into the second polarized light POL2. In other words, of the light emitted from the light source LS, the second polarized light POL2 is converged by the optical control device 100.

According to such optical control device 100, the first liquid crystal cell 1 for modulating the first polarized light POL1 and the second liquid crystal cell 2 for modulating the second polarized light POL2 can be configured with the same specification. For this reason, regardless of the shape of the modulation area, by stacking the first liquid crystal cell 1 and the second liquid crystal cell 2, the optical control device 100 that modulates (converges or diverges) light can be provided. In addition, according to the present embodiment, as compared with a case where the first liquid crystal cell 1 and the second liquid crystal cell 2 are configured with different specifications, it is possible to integrate the manufacturing line, thereby allowing the optical control device 100 to be manufactured at low cost.

Figure 7:
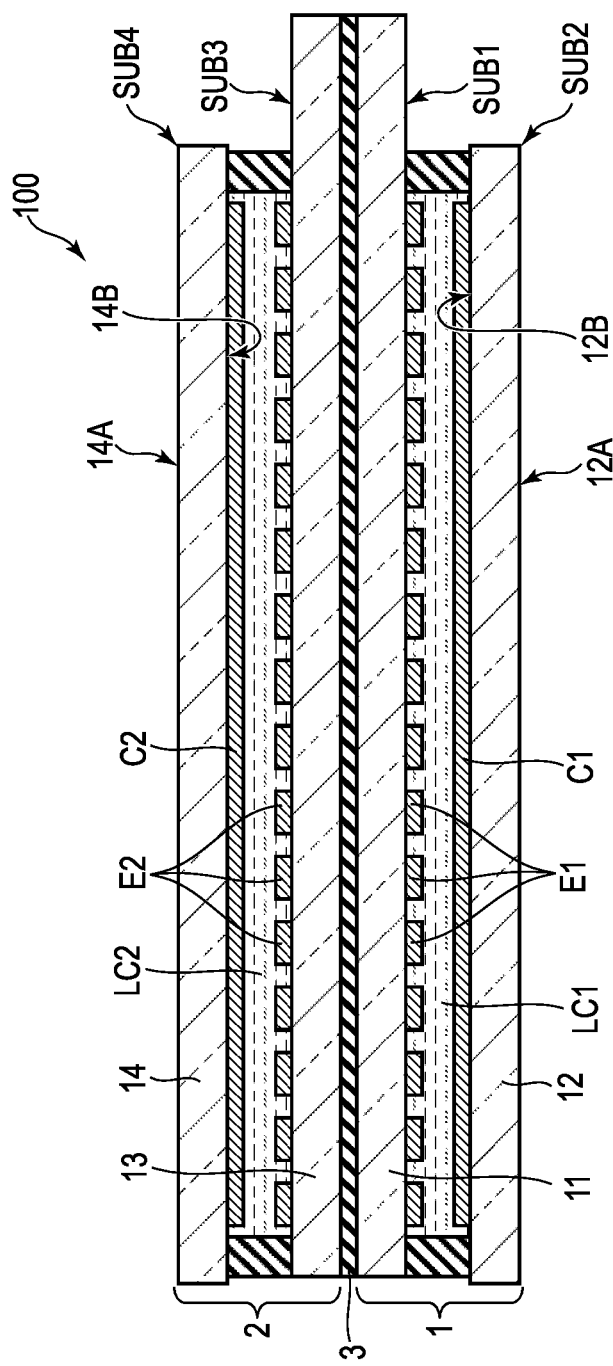
FIG. 7 is a cross-sectional diagram showing another configuration example of the optical control device 100.

FIG. 7 is a cross-sectional diagram showing another configuration example of the optical control device 100. The configuration example shown in FIG. 7 is different from the configuration example shown in FIG. 1 in that the first substrate SUB1 and the third substrate SUB3 are bonded with the transparent adhesive layer 3. The second substrate SUB2 and the fourth substrate SUB4 are each in contact with the air layer. More specifically, the adhesive layer 3 bonds the insulating substrate 11 and the insulating substrate 13. The refractive index of the adhesive layer 3 is equal to the refractive indexes of the insulating substrates 11 and 13. In contrast, an outer surface 12A of the insulating substrate 12 and the outer surface 14A of the insulating substrate 14 are each in contact with the air layer.

The first common electrode C1 is provided on an inner surface 12B of the insulating substrate 12, and the second common electrode C2 is provided on an inner surface 14B of the insulating substrate 14. In other words, in the optical control device 100, the first liquid crystal layer LC1 and the second liquid crystal layer LC2 are located between the first common electrode C1 and the second common electrode C2 that are plate electrodes. For example, the first common electrode C1 and the second common electrode C2 formed of ITO are conductive layers and function as an ultraviolet absorbing layer.

According to this configuration example, the same effect as in the above configuration example can be obtained. In addition, ultraviolet rays incident from the outer surface 12A are absorbed by the first common electrode C1, and ultraviolet rays incident from the outer surface 14A are absorbed by the second common electrode C2. Therefore, deterioration of the first liquid crystal layer LC1 and the second liquid crystal layer LC2 due to the ultraviolet rays is suppressed.

The second substrate SUB2 is discharged via the first common electrode C1, and the fourth substrate SUB4 is discharged via the second common electrode C2. Therefore, in the first liquid crystal layer LC1 and the second liquid crystal layer LC2, alignment failure of the liquid crystal molecules caused by undesirable charging is suppressed.

Figure 8:
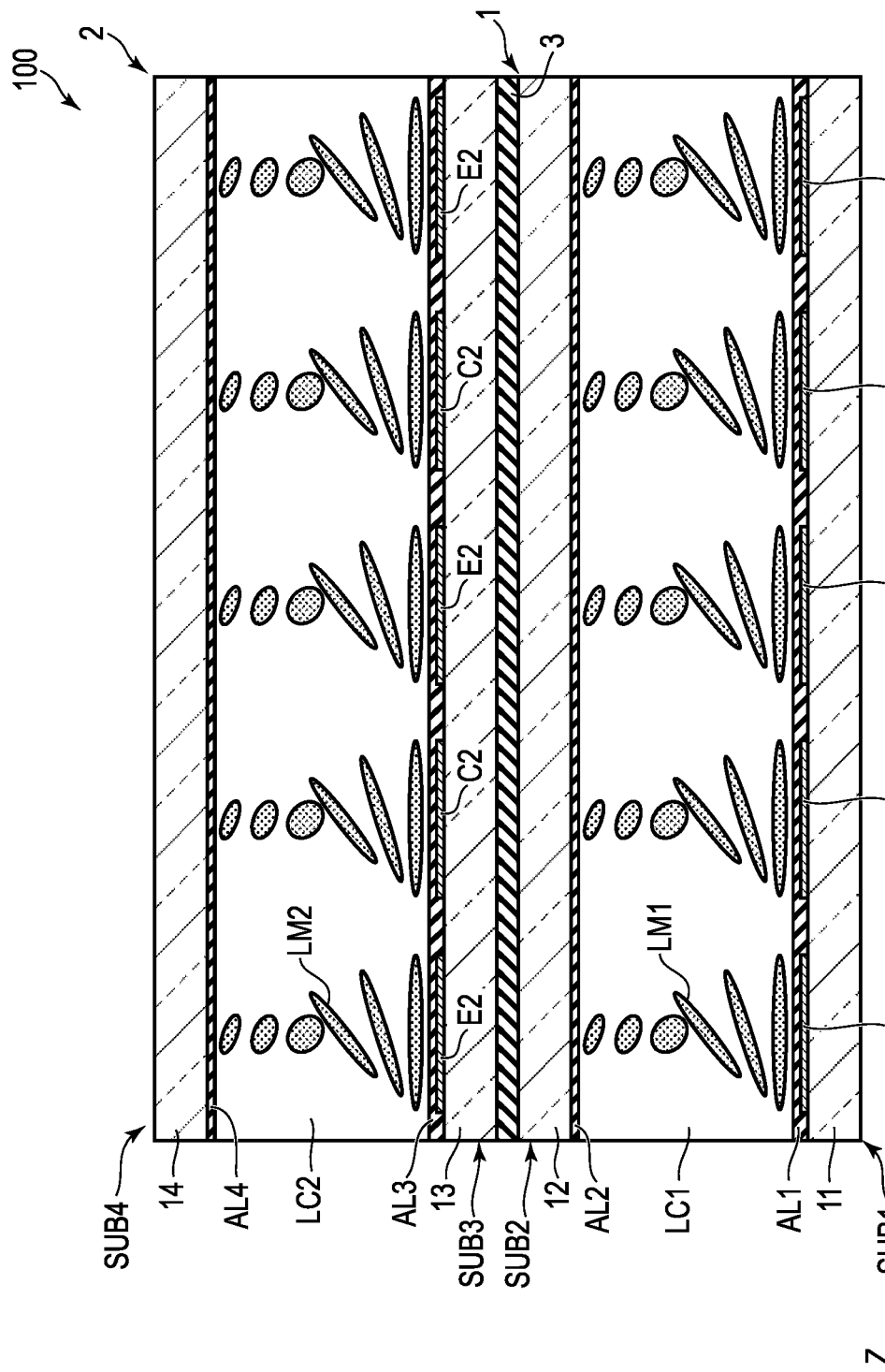
FIG. 8 is a diagram showing another configuration example of the optical control device 100 according to one embodiment.

FIG. 8 is a diagram showing another configuration example of the optical control device 100 of the present embodiment. The configuration example shown in FIG. 8 is different from the configuration example shown in FIG. 1 in that in the first liquid crystal cell 1, the first substrate SUB1 includes the first control electrode E1 and the first common electrode C1, and the first common electrode C1 is located between adjacent first control electrodes E1. The first control electrode E1 and the first common electrode C1 are located in the same layer. For example, the first control electrode E1 and the first common electrode C1 are provided on the insulating substrate 11 and covered with the alignment film AL1. The first control electrode E1 and the first common electrode C1 are formed of, for example, the same transparent conductive material. Incidentally, in the example shown, one first control electrode E1 is disposed between adjacent first common electrodes C1. However, a plurality of first control electrodes E1 may be disposed between adjacent first common electrodes C1, or a plurality of first common electrodes C1 may be disposed between adjacent first control electrodes E1.

Also, in the second liquid crystal cell 2, similarly to the first liquid crystal cell 1, the third substrate SUB3 includes the second control electrode E2 and the second common electrode C2. The second common electrode C2 is located between adjacent second control electrodes E2. In addition, the second control electrode E2 and the second common electrode C2 are located in the same layer.

The width of the first common electrode C1 is equal to the width W2 of the second common electrode C2, and the interval between the first control electrode E1 and the first common electrode C1 is equal to the interval between the second control electrode E2 and the second common electrode C2. The second control electrode E2 is located directly above the first control electrode E1, and the second common electrode C2 is located directly above the first common electrode C1. In other words, in planar view, the plurality of first control electrodes E1 overlap the plurality of second control electrodes E2, and the plurality of first common electrodes C1 overlap the plurality of second common electrodes C2.

The first liquid crystal cell 1 and the second liquid crystal cell 2 are bonded to each other with the transparent adhesive layer 3. In the example shown, the second substrate SUB2 and the third substrate SUB3 are bonded to each other with the adhesive layer 3. The refractive index of the adhesive layer 3 is equal to the refractive indexes of the insulating substrates 12 and 13. In contrast, the outer surfaces of the insulating substrates 11 and 14 are each in contact with the air layer. No electrode is provided on the second substrate SUB2 and the fourth substrate SUB4. In particular, from the viewpoint of suppressing the incidence of ultraviolet rays from the fourth substrate SUB4, an ultraviolet absorbing layer may be provided on the outer surface of the fourth substrate SUB4 (or the outer surface of the insulating substrate 14). A specific example of the ultraviolet absorbing layer will be described later with reference to FIG. 13.

Figure 9:
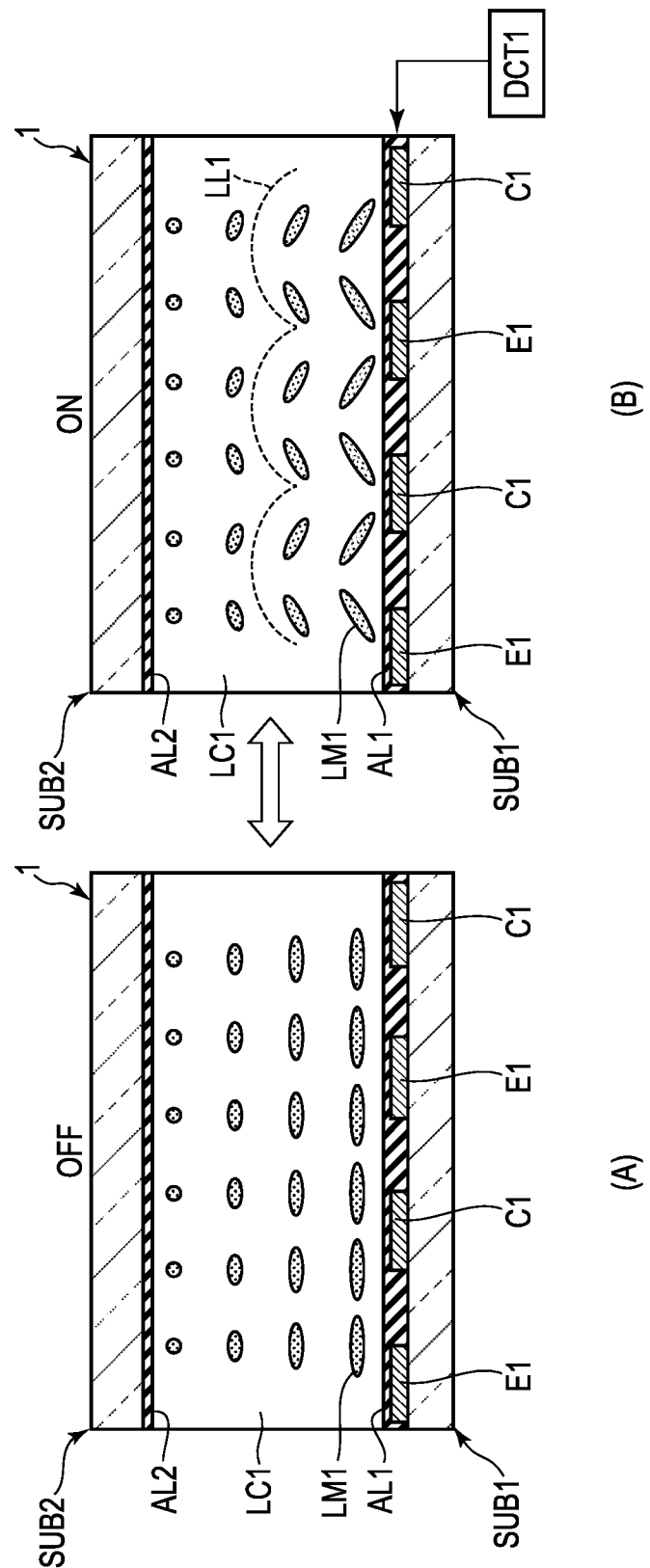
FIG. 9 is a diagram for describing the liquid crystal lens LL1 formed in the first liquid crystal cell 1 shown in FIG. 8.

FIG. 9 is a diagram for describing the liquid crystal lens LL1 formed in the first liquid crystal cell 1 shown in FIG. 8. In FIG. 9, only configurations necessary for description are shown. Although not described, the liquid crystal lens LL2 similar to the liquid crystal lens LL1 to be described with reference to FIG. 9 can also be formed in the second liquid crystal cell 2.

(A) of FIG. 9 shows an off state (OFF) in which no potential difference is generated between the first control electrode E1 and the first common electrode C1. The liquid crystal molecules LM1 included in the first liquid crystal layer LC1 are twisted and aligned by alignment restriction forces of the alignment films AL1 and AL2.

(B) of FIG. 9 shows an on state (ON) in which a potential difference is formed between the first control electrode E1 and the first common electrode C1. The voltage controller DCT1 supplies a predetermined voltage to each of the first control electrode E1 and the first common electrode C1. In a state where an electric field is formed, the liquid crystal molecules LM1 are aligned so that their major axes are along the electric field. As a result, the liquid crystal lens LL1 as indicated by dotted lines in the drawing is formed.

Also in the configuration examples shown in FIGS. 8 and 9, the same effect as in the above configuration example can be obtained. In addition, in this configuration example, the feed line PL and the conducting material CD as described with reference to FIG. 2 are unnecessary, and the configuration can be simplified. Incidentally, in the configuration examples shown in FIGS. 8 and 9, similar to the configuration example shown in FIG. 7, the first substrate SUB1 and the third substrate SUB3 may be bonded with the transparent adhesive layer 3.

Figure 10:
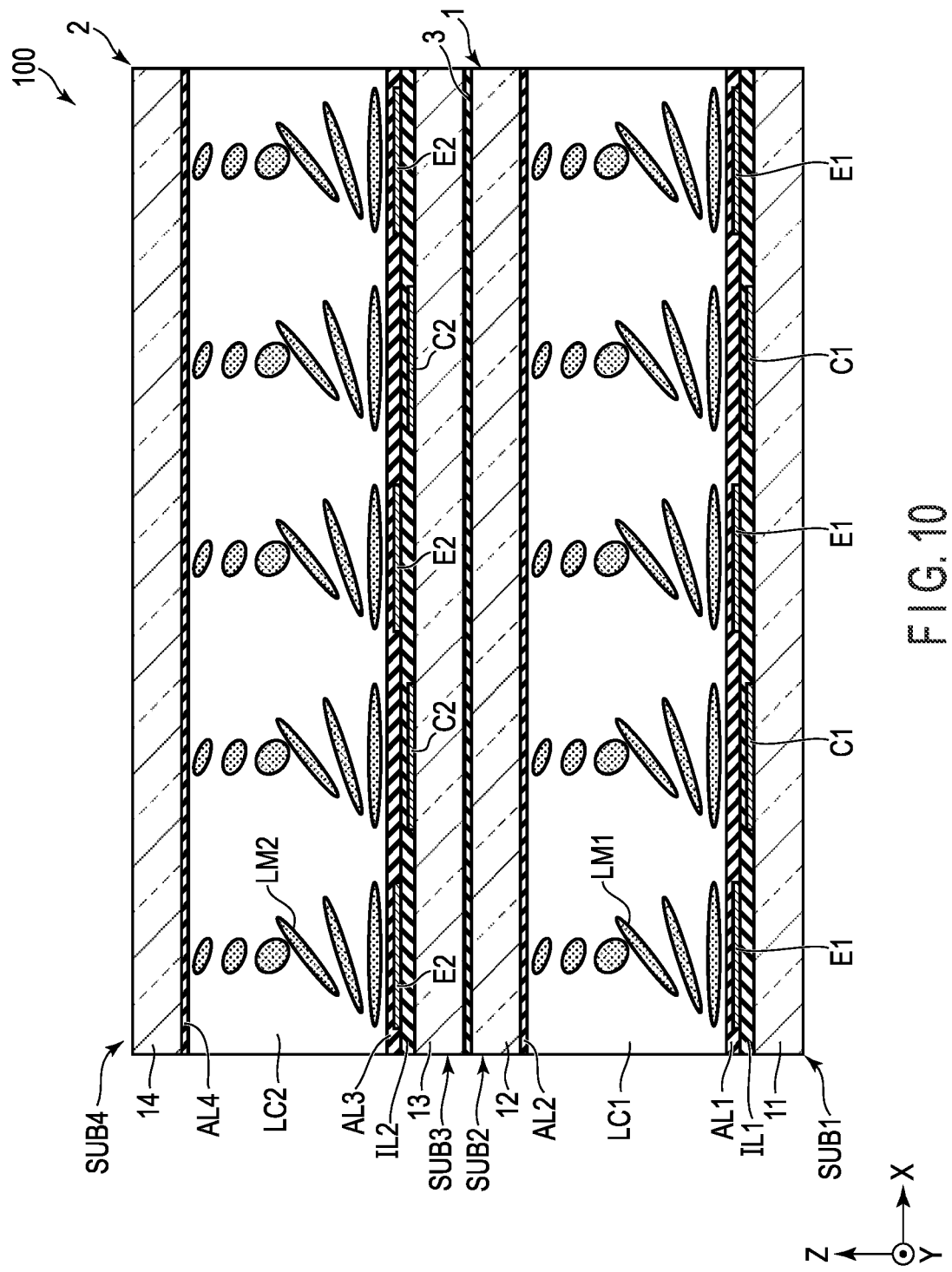
FIG. 10 is a diagram showing another configuration example of the optical control device 100 according to one embodiment.

FIG. 10 is a diagram showing another configuration example of the optical control device 100 of the present embodiment. The configuration example shown in FIG. 10 is different from the configuration example shown in FIG. 8 in that the first substrate SUB1 includes an insulating film (first insulating film) IL1 located between the first control electrode E1 and the first common electrode C1. In other words, it is different in that the first control electrode E1 is located in a layer different from the first common electrode C1. For example, the first common electrode C1 is provided on the insulating substrate 11 and covered with the insulating film IL1. The first control electrode E1 is located on the insulating film IL1 and is covered with the alignment film AL1. The first common electrode C1 is located between adjacent first control electrodes E1.

Also, in the second liquid crystal cell 2, similarly to the first liquid crystal cell 1, the third substrate SUB3 includes an insulating film (second insulating film) IL2 located between the second control electrode E2 and the second common electrode C2. For example, the second common electrode C2 is provided on the insulating substrate 13 and covered with the insulating film IL2. The second control electrode E2 is located on the insulating film IL2 and is covered with the alignment film AL3. The second common electrode C2 is located between adjacent second control electrodes E2.

The width of the first common electrode C1 is equal to the width W2 of the second common electrode C2, and the interval between the first control electrode E1 and the first common electrode C1 is equal to the interval between the second control electrode E2 and the second common electrode C2. The second control electrode E2 is located directly above the first control electrode E1, and the second common electrode C2 is located directly above the first common electrode C1. In other words, in planar view, the plurality of first control electrodes E1 overlap the plurality of second control electrodes E2, and the plurality of first common electrodes C1 overlap the plurality of second common electrodes C2.

The second substrate SUB2 and the third substrate SUB3 are bonded to each other with the transparent adhesive layer 3. The refractive index of the adhesive layer 3 is equal to the refractive indexes of the insulating substrates 12 and 13. In contrast, the outer surfaces of the insulating substrates 11 and 14 are each in contact with the air layer. No electrode is provided on the second substrate SUB2 and the fourth substrate SUB4. In particular, from the viewpoint of suppressing the incidence of ultraviolet rays from the fourth substrate SUB4, an ultraviolet absorbing layer may be provided on the outer surface of the fourth substrate SUB4 (or the outer surface of the insulating substrate 14). A specific example of the ultraviolet absorbing layer will be described later with reference to FIG. 13.

Also in the configuration example shown in FIG. 10, the same effect as in the configuration example shown in FIG. 8 can be obtained. In addition, since the first control electrode E1 and the first common electrode C1 to which different voltages are supplied are provided with the insulating film IL1 interposed therebetween, intervals between the electrodes arranged in the same layer are widened, which can improve yields. Incidentally, in the configuration example shown in FIG. 10, similar to the configuration example shown in FIG. 7, the first substrate SUB1 and the third substrate SUB3 may be bonded with the transparent adhesive layer 3.

The first control electrode E1 and the second control electrode E2, and the first common electrode C1 and the second common electrode C2 described with reference to FIGS. 8 and 10 may be the strip electrodes described with reference to FIG. 3, or may have other shapes. Examples of other shapes will be described below.

Figure 11:
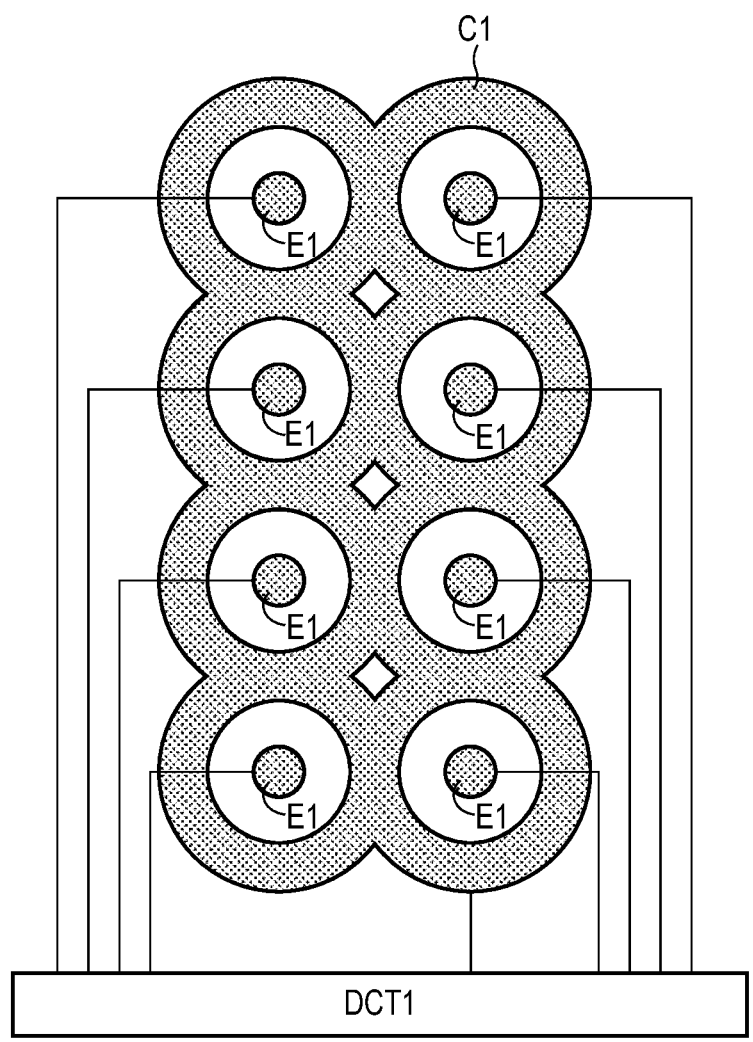
FIG. 11 is a diagram showing another shape of a first control electrode E1.

In the example shown in FIG. 11, the first control electrode E1 is formed in a substantially circular dot shape. The first common electrode C1 is formed in an annular shape surrounding each of the plurality of first control electrodes E1. The plurality of first control electrodes E1 and the first common electrode C1 are each electrically connected to the voltage controller DCT1. For example, a lens array can be formed by forming an electric field between each of the first control electrodes E1 and the first common electrode C1.

Figure 12:
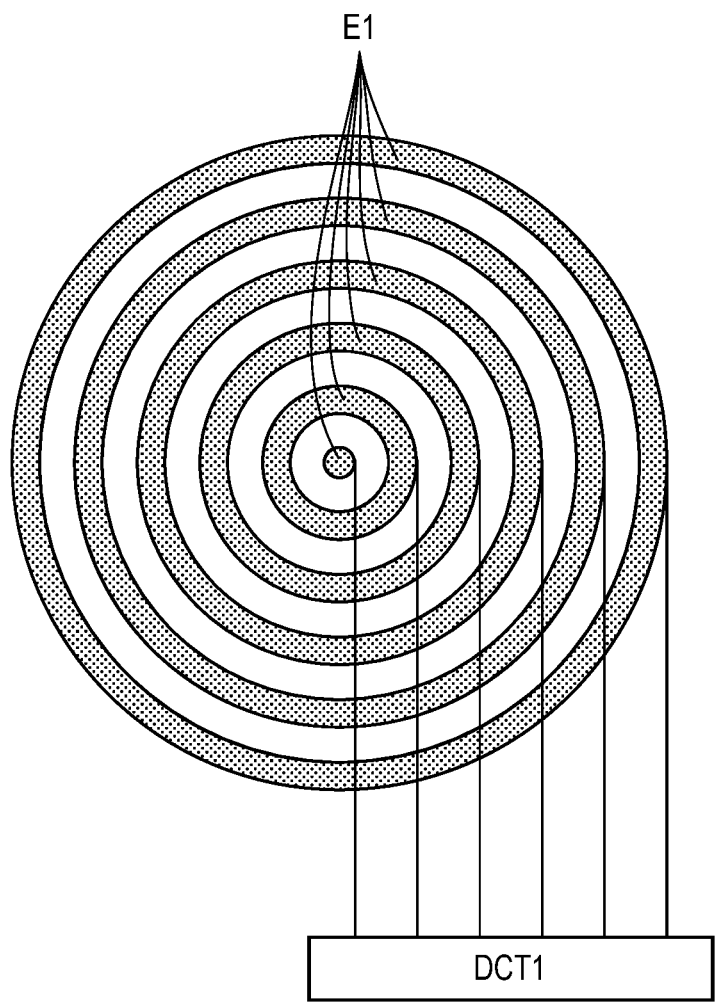
FIG. 12 is a diagram showing another shape of the first control electrode E1.

In the example shown in FIG. 12, the plurality of first control electrodes E1 are formed in a concentric circle shape. The plurality of first control electrodes E1 are each electrically connected to the voltage controller DCT1. For example, a circular lens can be formed by controlling voltage supplied to each of the first control electrodes E1.

FIG. 13 is a cross-sectional diagram showing another configuration example of the optical control device 100. The configuration example shown in FIG. 13 is different from the configuration examples shown in FIGS. 8 and 10 in that the first substrate SUB1 and the third substrate SUB3 are bonded with the transparent adhesive layer 3. The second substrate SUB2 and the fourth substrate SUB4 are located on the side opposite to the adhesive layer 3. A first ultraviolet absorbing layer 21 is provided on an outer surface of the first liquid crystal cell 1 (or an outer surface of the second substrate SUB2), and a second ultraviolet absorbing layer 22 is provided on an outer surface of the second liquid crystal cell 2 (or an outer surface of the fourth substrate SUB4). More specifically, the first ultraviolet absorbing layer 21 is provided on the outer surface 12A of the insulating substrate 12, and the second ultraviolet absorbing layer 22 is provided on the outer surface 14A of the insulating substrate 14. In other words, in the optical control device 100, the first liquid crystal layer LC1 and the second liquid crystal layer LC2 are located between the first ultraviolet absorbing layer 21 and the second ultraviolet absorbing layer 22. The first ultraviolet absorbing layer 21 and the second ultraviolet absorbing layer 22 are transparent conductive layers formed of, for example, ITO.

According to this configuration example, the same effect as in the configuration example described with reference to FIG. 7 can be obtained. In other words, ultraviolet rays incident from the second substrate SUB2 side on which no electrode is provided are absorbed by the first ultraviolet absorbing layer 21. In addition, ultraviolet rays incident from the fourth substrate SUB4 side on which no electrode is provided are absorbed by the second ultraviolet absorbing layer 22. Therefore, deterioration of the first liquid crystal layer LC1 and the second liquid crystal layer LC2 due to the ultraviolet rays is suppressed.

Incidentally, in the configuration example shown in FIG. 13, the first control electrode E1 and the first common electrode C1 of the first substrate SUB1 are located in the same layer, but the first control electrode E1 may be located in a layer different from the first common electrode C1. Similarly, the second control electrode E2 and the second common electrode C2 of the third substrate SUB3 are located in the same layer, but the second control electrode E2 may be located in a layer different from the second common electrode C2.

As described above, according to the present embodiment, it is possible to provide an optical control device that can be manufactured at low cost.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical control device comprising:
a first liquid crystal cell comprising a first substrate comprising a plurality of first control electrodes, a second substrate, and a first liquid crystal layer twisted and aligned between the first substrate and the second substrate; and
a second liquid crystal cell comprising a third substrate comprising a plurality of second control electrodes, a fourth substrate, and a second liquid crystal layer twisted and aligned between the third substrate and the fourth substrate,
wherein the second liquid crystal cell is stacked on the first liquid crystal cell,
the first control electrode overlaps the second control electrode,
the first liquid crystal cell has a function of modulating and converting a first polarization component of incident light into a second polarization component, and hardly modulating and converting a third polarization component of incident light into a fourth polarization component,
the second liquid crystal cell has a function of hardly modulating the second polarization component transmitted through the first liquid crystal cell, and modulating the fourth polarization component transmitted through the first liquid crystal cell, and
the plurality of first control electrodes and the plurality of second control electrodes are arranged spaced apart in a first direction and elongated in a second direction intersecting the first direction.

2. The optical control device according to claim 1, wherein
the first liquid crystal cell and the second liquid crystal cell have a same optical rotatory power,
the second polarization component and the third polarization component have a same polarization plane, and
the first polarization component and the fourth polarization component have a same polarization plane.

3. The optical control device according to claim 1, wherein
a width of the first control electrode is equal to a width of the second control electrode, and
an interval between the first control electrodes is equal to an interval between the second control electrodes.

4. The optical control device according to claim 3, wherein
the first liquid crystal cell has a first modulation area provided with the plurality of first control electrodes,
the second liquid crystal cell has a second modulation area provided with the plurality of second control electrodes, and
the first modulation area and the second modulation area have a same shape and are formed in a rectangular shape.

5. The optical control device according to claim 4, wherein
the second substrate comprises a first common electrode opposed to the plurality of first control electrodes, and
the fourth substrate comprises a second common electrode opposed to the plurality of second control electrodes.

6. The optical control device according to claim 5, further comprising an adhesive layer that is transparent and bonds the first substrate and the third substrate.

7. The optical control device according to claim 6, wherein the second substrate and the fourth substrate are each in contact with an air layer.

8. The optical control device according to claim 5, further comprising an adhesive layer that is transparent and bonds the second substrate and the third substrate.

9. The optical control device according to claim 8, wherein the first substrate and the fourth substrate are each in contact with an air layer.

10. An optical control device comprising:
a first liquid crystal cell comprising a first substrate comprising a plurality of first control electrodes, a second substrate, and a first liquid crystal layer twisted and aligned between the first substrate and the second substrate; and
a second liquid crystal cell comprising a third substrate comprising a plurality of second control electrodes, a fourth substrate, and a second liquid crystal layer twisted and aligned between the third substrate and the fourth substrate,
wherein the second liquid crystal cell is stacked on the first liquid crystal cell,
the first control electrode overlaps the second control electrode,
the first liquid crystal cell has a function of modulating and converting a first polarization component of incident light into a second polarization component, and hardly modulating and converting a third polarization component of incident light into a fourth polarization component,
the second liquid crystal cell has a function of hardly modulating the second polarization component transmitted through the first liquid crystal cell, and modulating the fourth polarization component transmitted through the first liquid crystal cell,
the first substrate further comprises a first common electrode located between adjacent first control electrodes,
the first control electrodes and the first common electrode are located in a same layer,
the third substrate further comprises a second common electrode located between adjacent second control electrodes,
the second control electrodes and the second common electrode are located in a same layer, and the first common electrode overlaps the second common electrode.

11. The optical control device according to claim 10, further comprising:
an adhesive layer that is transparent and bonds the first liquid crystal cell and the second liquid crystal cell; and
an ultraviolet absorbing layer provided on at least one of an outer surface of the first liquid crystal cell and an outer surface of the second liquid crystal cell,
wherein the ultraviolet absorbing layer is a transparent conductive layer.

12. The optical control device according to claim 10, further comprising:
an adhesive layer that is transparent and bonds the first substrate and the third substrate;
a first ultraviolet absorbing layer provided on an outer surface of the second substrate; and
a second ultraviolet absorbing layer provided on an outer surface of the fourth substrate,
wherein each of the first ultraviolet absorbing layer and the second ultraviolet absorbing layer is a transparent conductive layer.

13. An optical control device comprising:
a first liquid crystal cell comprising a first substrate comprising a plurality of first control electrodes, a second substrate, and a first liquid crystal layer twisted and aligned between the first substrate and the second substrate; and
a second liquid crystal cell comprising a third substrate comprising a plurality of second control electrodes, a fourth substrate, and a second liquid crystal layer twisted and aligned between the third substrate and the fourth substrate,
wherein the second liquid crystal cell is stacked on the first liquid crystal cell,
the first control electrode overlaps the second control electrode,
the first liquid crystal cell has a function of modulating and converting a first polarization component of incident light into a second polarization component, and hardly modulating and converting a third polarization component of incident light into a fourth polarization component,
the second liquid crystal cell has a function of hardly modulating the second polarization component transmitted through the first liquid crystal cell, and modulating the fourth polarization component transmitted through the first liquid crystal cell,
the first substrate further comprises a first common electrode located between adjacent first control electrodes; and a first insulating film located between the first control electrodes and the first common electrode,
the third substrate further comprises a second common electrode located between adjacent second control electrodes, and a second insulating film located between the second control electrodes and the second common electrode, and
the first common electrode overlaps the second common electrode.

14. The optical control device according to claim 13, further comprising:
an adhesive layer that is transparent and bonds the first liquid crystal cell and the second liquid crystal cell; and
an ultraviolet absorbing layer provided on at least one of an outer surface of the first liquid crystal cell and an outer surface of the second liquid crystal cell,
wherein the ultraviolet absorbing layer is a transparent conductive layer.

15. The optical control device according to claim 13, further comprising:
an adhesive layer that is transparent and bonds the first substrate and the third substrate;
a first ultraviolet absorbing layer provided on an outer surface of the second substrate; and
a second ultraviolet absorbing layer provided on an outer surface of the fourth substrate,
wherein each of the first ultraviolet absorbing layer and the second ultraviolet absorbing layer is a transparent conductive layer.

* * * * *